US006956486B2

(12) United States Patent
King, Jr.

(10) Patent No.: US 6,956,486 B2
(45) Date of Patent: Oct. 18, 2005

(54) BATHTUB WATER LEVEL MONITORING SYSTEM

(76) Inventor: Robert L. King, Jr., 6804 Miller Ave., Gary, IN (US) 46403

( * ) Notice: Subject to any disclaimer, the term of this patent is extended or adjusted under 35 U.S.C. 154(b) by 182 days.

(21) Appl. No.: 10/693,708

(22) Filed: Oct. 24, 2003

(65) Prior Publication Data

US 2005/0088308 A1 Apr. 28, 2005

(51) Int. Cl.$^7$ ............................................. G08B 21/00
(52) U.S. Cl. ........................ 340/618; 73/304 R; 4/559
(58) Field of Search ................................ 340/618, 619, 340/620, 621, 622, 623; 200/61.2, 61.21; 73/1.73, 304 R; 4/496, 559, 504, 541.2, 668

(56) References Cited

U.S. PATENT DOCUMENTS

| 331,801 A | 12/1885 | Logee |
| 3,182,505 A | 5/1965 | Harks |
| 4,258,444 A | 3/1981 | Orszullok |
| 4,757,305 A | 7/1988 | Peso |
| 4,804,947 A * | 2/1989 | Geleziunas ................. 340/620 |
| 4,922,226 A | 5/1990 | Hsieh et al. |
| 5,661,462 A | 8/1997 | Shrewsbury-Gee |
| 5,969,620 A * | 10/1999 | Okulov ....................... 340/620 |
| 5,975,124 A * | 11/1999 | Stevens, II .................. 137/392 |

FOREIGN PATENT DOCUMENTS

| FR | 2667392 | * 10/1990 | ........... G01F 23/24 |
| GB | 2387229 | * 10/2003 | ........... G01F 23/24 |
| WO | WO 90/13881 | 11/1990 | |
| WO | WO 92/09757 | 6/1992 | |

* cited by examiner

Primary Examiner—Jeffery Hofsass
Assistant Examiner—Jennifer Stone
(74) Attorney, Agent, or Firm—Welsh & Katz, Ltd.

(57) ABSTRACT

A bathtub water level monitoring system for alerting a user upon acquisition of a pre-selected water level in a bathtub. The bathtub water level monitoring system includes a main unit adapted for attachment to an interior face of a bathtub, the main unit having a plurality of water sensors aligned along a lower portion of the main unit. The main unit further includes a transmitter and alarm system for producing an audible alarm upon the water sensors detecting a predetermined water level. The system includes a remote alarm device for giving an audible alarm upon reception of a signal transmitted from the transmitter of the main unit.

12 Claims, 2 Drawing Sheets

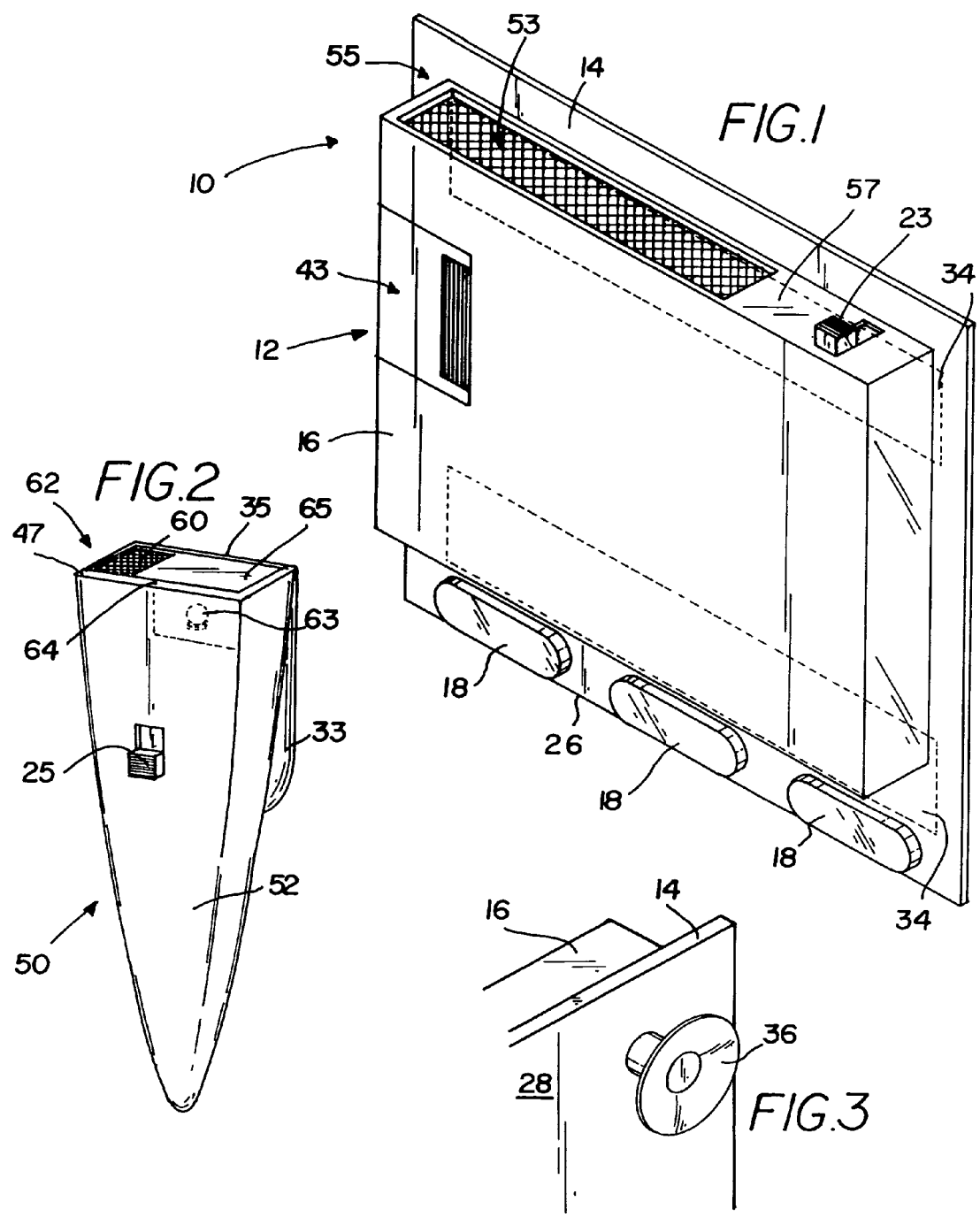

BATHTUB WATER LEVEL MONITORING SYSTEM

BACKGROUND OF THE INVENTION

1. Field of the Invention

The present invention relates to alarm systems and more particularly pertains to a new bathtub water level monitoring system for alerting a user upon acquisition of a pre-selected water level in a bathtub.

2. Description of the Prior Art

The use of alarm systems is known in the prior art. More specifically, alarm systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,661,462; 4,757,305; 4,258,444; 4,922,226; 331,801; 3,182,505; foreign patent No. WO 90/13881; and foreign patent No. WO 92/09757.

While these devices fulfill their respective, particular objectives and requirements, the aforementioned patents do not disclose a new bathtub water level monitoring system. The inventive device includes a main unit adapted for attachment to an interior face of a bathtub, the main unit having a plurality of water sensors aligned along a lower portion of the main unit. The main unit further includes a transmitter and alarm system for producing an audible alarm upon the water sensors detecting a pre-determined water level. The system includes a remote alarm device for giving an audible alarm upon reception of a signal transmitted from the transmitter of the main unit.

In these respects, the bathtub water level monitoring system according to the present invention substantially departs from the conventional concepts and designs of the prior art, and in so doing provides an apparatus primarily developed for the purpose of alerting a user upon acquisition of a pre-selected water level in a bathtub.

SUMMARY OF THE INVENTION

In view of the foregoing disadvantages inherent in the known types of alarm systems now present in the prior art, the present invention provides a new bathtub water level monitoring system construction wherein the same can be utilized for alerting a user upon acquisition of a pre-selected water level in a bathtub.

The general purpose of the present invention, which will be described subsequently in greater detail, is to provide a new bathtub water level monitoring system apparatus and method which has many of the advantages of the alarm systems mentioned heretofore and many novel features that result in a new bathtub water level monitoring system which is not anticipated, rendered obvious, suggested, or even implied by any of the prior art alarm systems, either alone or in any combination thereof.

To attain this, the present invention generally comprises a main unit adapted for attachment to an interior face of a bathtub, the main unit having a plurality of water sensors aligned along a lower portion of the main unit. The main unit further includes a transmitter and alarm system for producing an audible alarm upon the water sensors detecting a pre-determined water level. The system includes a remote alarm device for giving an audible alarm upon reception of a signal transmitted from the transmitter of the main unit.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new bathtub water level monitoring system apparatus and method which has many of the advantages of the alarm systems mentioned heretofore and many novel features that result in a new bathtub water level monitoring system which is not anticipated, rendered obvious, suggested, or even implied by any of the prior art alarm systems, either alone or in any combination thereof.

It is another object of the present invention to provide a new bathtub water level monitoring system that may be easily and efficiently manufactured and marketed.

It is a further object of the present invention to provide a new bathtub water level monitoring system that is of a durable and reliable construction.

An even further object of the present invention is to provide a new bathtub water level monitoring system which is susceptible of a low cost of manufacture with regard to both materials and labor, and which accordingly is then susceptible of low prices of sale to the consuming public, thereby making such bathtub water level monitoring system economically available to the buying public.

Still yet another object of the present invention is to provide a new bathtub water level monitoring system which provides in the apparatuses and methods of the prior art some of the advantages thereof, while simultaneously overcoming some of the disadvantages normally associated therewith.

Still another object of the present invention is to provide a new bathtub water level monitoring system for alerting a user upon acquisition of a pre-selected water level in a bathtub.

Yet another object of the present invention is to provide a new bathtub water level monitoring system which includes a main unit adapted for attachment to an interior face of a bathtub, the main unit having a plurality of water sensors aligned along a lower portion of the main unit. The main unit further includes a transmitter and alarm system for producing an audible alarm upon the water sensors detecting a pre-determined water level. The system includes a remote alarm device for giving an audible alarm upon reception of a signal transmitted from the transmitter of the main unit.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new bathtub water level monitoring system according to the present invention.

FIG. 2 is a perspective view of the remote unit of the present invention.

FIG. 3 is a perspective view of the back of a portion of the main unit of the present invention.

DESCRIPTION OF THE PREFERRED EMBODIMENT

Figure 4:
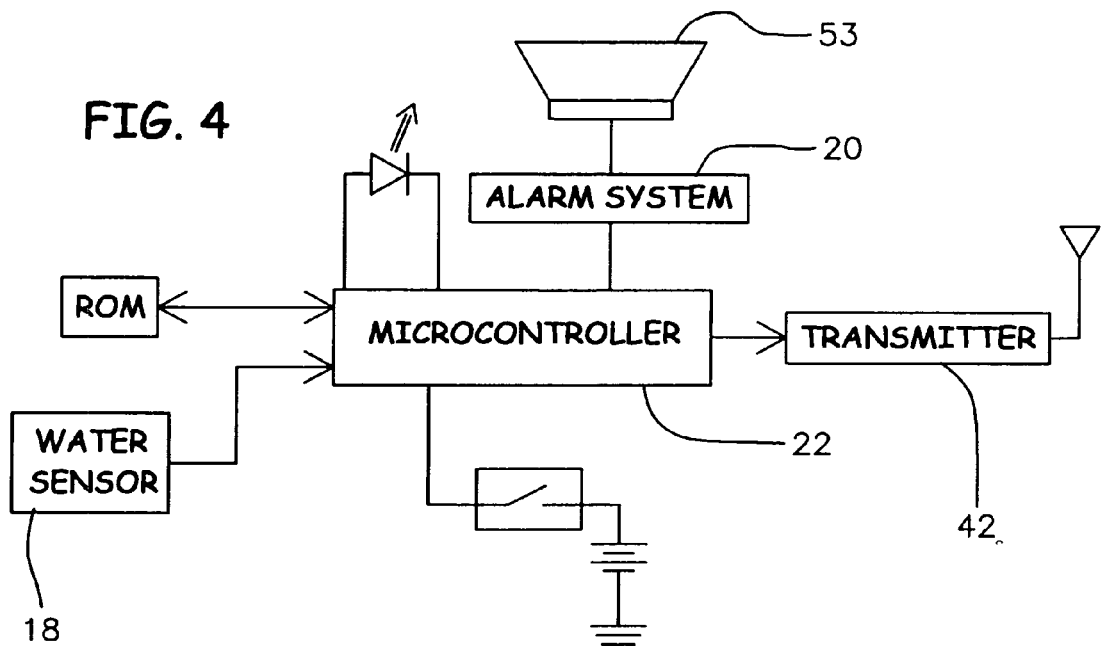
FIG. 4 is a schematic view of the main unit components of the present invention.
Figure 5:
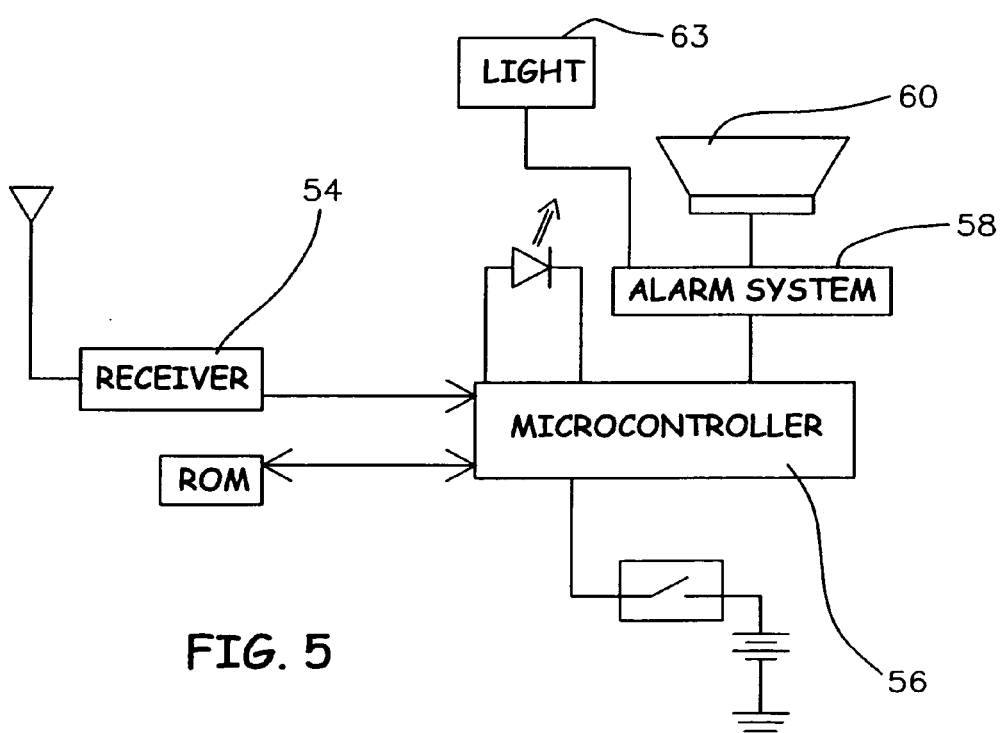
FIG. 5 is a schematic view of the remote unit components of the present invention.

With reference now to the drawings, and in particular to FIGS. 1 through 5 thereof, a new bathtub water level monitoring system embodying the principles and concepts of the present invention and generally designated by the reference numeral 10 will be described.

As best illustrated in FIGS. 1 through 5, the bathtub water level monitoring system 10 generally comprises a main unit 12 designed for positioning in an interior of a bathtub. The main unit includes a backing member 14, a main unit housing 16 extending outwardly from the backing member, and a plurality of sensors 18 extending outwardly from the backing member. In an embodiment, the sensors are positioned in spaced relationship below the main unit housing.

A main alarm system 20 is positioned in the main unit housing. A main microcontroller 22 is also positioned in the main unit housing. The sensors are operationally coupled to the main microcontroller and are designed for detecting when an upper surface of water inside the bathtub contacts the sensors.

The main microcontroller is designed for activating the main alarm system to produce an audible alarm signal when the sensors detect water contacting the sensors.

In an embodiment, the main unit includes three sensors aligned generally horizontally proximate a lower edge 26 of the backing member. Using the three sensors, the main microcontroller is designed for activating the main alarm system only upon all three sensors detecting contact with water. By requiring contact with all three sensors, premature activation of the main alarm due to splashing of water on less than three of the sensors is prevented prior to an upper surface of water in the bathtub reaching the sensors. Thus false alarms are minimized.

At least one fastener 32 is coupled to a rear face 28 of the backing member. The fastener is designed for coupling the backing member to an interior wall of the bathtub such that the sensors are positioned at a desired water level. Two such fasteners contemplated for use are a magnet 34 and a suction cup 36. A pair of magnets may be used and positioned horizontally proximate respective upper and lower sides of the backing member. In an embodiment, four suction cups are used, each one being positioned proximate a respective corner of the rear face 28.

The main unit also includes a transmitter 42 positioned in the main unit housing for sending a remote activation signal.

A remote unit 50 is provided and includes a remote housing 52. The remote unit includes a receiver 54 positioned in the remote housing for receiving the remote activation signal sent by the transmitter.

A remote microcontroller 56 is positioned in the remote housing and is operationally coupled to the remote microcontroller. A remote alarm system 58 is positioned in the remote housing and is operationally coupled to the remote microcontroller.

The remote microcontroller is designed for activating the remote alarm system when the receiver receives the activation signal from the transmitter.

The remote alarm system including a remote speaker 60 positioned adjacent to a speaker opening 62 in the top 64 of the remote housing. In an embodiment, the remote alarm system also includes a remote light 63. The remote light is designed for producing a flashing visual signal upon activation of the remote alarm system by the remote microcontroller. The remote light is positioned adjacent to a light cover 65 in the top of the remote housing.

In an embodiment, the top of the remote housing is generally rectangular and the remote housing includes tapered sides 67 extending downwardly from an outer perimeter edge 47 of the top to a rounded distal end 49. Thus, the remote housing forms a generally elongated inverted rectangular pyramid such that the remote housing is designed to facilitate insertion of the remote housing into a pocket of a garment.

In an embodiment, the remote housing also includes a clip 33 extending downwardly from a lengthwise edge 35 of the outer perimeter of the top such that the remote housing is designed to facilitate coupling of the remote housing to a garment worn by a user.

The main alarm system includes a main speaker 53. The main speaker is positioned adjacent to a speaker opening 55 in a top 57 of the main unit housing.

A battery compartment 43 is provided for receiving batteries for providing power to the main unit.

The main unit includes an on/off switch 23 for selectively activating the sensors of the main unit and the remote unit includes a remote unit on/off switch 25 for selectively activating the remote unit.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A bathtub water level monitoring system, comprising:
   a main unit adapted for positioning in an interior of a bathtub, the main unit having a backing member, a main unit housing extending outwardly from the backing member, and a plurality of sensors extending outwardly from the backing member, the sensors being positioned below the main unit housing;
   a main alarm system positioned in the main unit housing;
   a main microcontroller positioned in the main unit housing;
   the sensors being operationally coupled to the main microcontroller, the sensors being adapted for detecting when an upper surface of water inside the bathtub contacts the sensors;
   the main microcontroller being for activating the main alarm system to produce an audible alarm signal when said sensors detect water contacting said sensors.

2. The bathtub water level monitoring system of claim 1, further comprising:
   said main unit having three sensors, said sensors being generally horizontally aligned proximate a lower edge of said backing member;
   said main microcontroller being for activating said main alarm system only upon all three sensors detecting contact with water to prevent premature activation of the main alarm due to splashing of water on less than three of the sensors prior to an upper surface of water in the bathtub reaching the sensors.

3. The bathtub water level monitoring system of claim 1, further comprising:
   at least one fastener being coupled to a rear face of said backing member, said fastener being adapted for coupling said backing member to an interior wall of the bathtub such that said sensors are positioned at a desired water level.

4. The bathtub water level monitoring system of claim 3, further comprising:
   said fastener being chosen from the group of fasteners consisting of a magnet and a suction cup.

5. The bathtub water level monitoring system of claim 1, further comprising:
   said main unit including a transmitter positioned in the main unit housing for sending a remote activation signal;
   a remote unit having a remote housing, said remote unit including a receiver positioned in said remote housing for receiving said remote activation signal,
   a remote microcontroller positioned in said remote housing, said receiver being operationally coupled to said remote microcontroller;
   a remote alarm system positioned in said remote housing, said remote alarm system being operationally coupled to said remote microcontroller;
   said remote microcontroller being for activating said remote alarm system when said receiver receives said activation signal from said transmitter.

6. The bathtub water level monitoring system of claim 5, further comprising:
   said remote housing having a top having an outer perimeter edge;
   said remote alarm system including a remote speaker, said remote speaker being positioned adjacent to a speaker opening in said top of said remote housing.

7. The bathtub water level monitoring system of claim 5, further comprising:
   said remote housing having a top having an outer perimeter edge;
   said remote alarm system including a remote light, said remote light being for producing a flashing visual signal upon activation of said remote alarm system by said remote microcontroller, said remote light being positioned adjacent to a light cover in said top of said remote housing.

8. The bathtub water level monitoring system of claim 6, further comprising:
   said top of said remote housing being generally rectangular;
   said remote housing having tapered sides extending downwardly from said outer perimeter edge to a rounded distal end relative to said top such that said remote housing forms a generally elongated inverted rectangular pyramid such that said remote housing is adapted to facilitate insertion of the remote housing into a pocket of a garment.

9. The bathtub water level monitoring system of claim 6, further comprising:
   said remote housing having a clip extending downwardly from a lengthwise edge of said outer perimeter of said top such that said remote housing is adapted to facilitate coupling of the remote housing to a garment worn by a user.

10. The bathtub water level monitor system of claim 1, further comprising:
    said main alarm system including a main speaker, said main speaker being positioned adjacent to a speaker opening in a top of said main unit housing.

11. The bathtub water level monitor of claim 1, further comprising:
    a battery compartment for receiving batteries for providing power to said main unit.

12. A bathtub water level monitoring system, comprising:
    a main unit adapted for positioning in an interior of a bathtub, the main unit having a backing member, a main unit housing extending outwardly from the backing member, and a plurality of sensors extending outwardly from the backing member, the sensors being positioned below the main unit housing;
    a main alarm system positioned in the main unit housing;
    a main microcontroller positioned in the main unit housing;
    the sensors being operationally coupled to the main microcontroller, the sensors being adapted for detecting when an upper surface of water inside the bathtub contacts the sensors;
    the main microcontroller being for activating the main alarm system to produce an audible alarm signal when said sensors detect water contacting said sensors;
    said main unit having three sensors, said sensors being generally horizontally aligned proximate a lower edge of said backing member;

said main microcontroller being for activating said main alarm system only upon all three sensors detecting contact with water to prevent premature activation of the main alarm due to splashing of water on less than three of the sensors prior to an upper surface of water in the bathtub reaching the sensors;

at least one fastener being coupled to a rear face of said backing member, said fastener being adapted for coupling said backing member to an interior wall of the bathtub such that said sensors are positioned at a desired water level;

said fastener being chosen from the group of fasteners consisting of a magnet and a suction cup;

said main unit including a transmitter positioned in the main unit housing for sending a remote activation signal;

a remote unit having a remote housing, said remote unit including a receiver positioned in said remote housing for receiving said remote activation signal, a remote microcontroller positioned in said remote housing, said receiver being operationally coupled to said remote microcontroller;

a remote alarm system positioned in said remote housing, said remote alarm system being operationally coupled to said remote microcontroller;

said remote microcontroller being for activating said remote alarm system when said receiver receives said activation signal from said transmitter;

said remote housing having a top having an outer perimeter edge;

said remote alarm system including a remote speaker, said remote speaker being positioned adjacent to a speaker opening in said top of said remote housing;

said remote alarm system including a remote light, said remote light being for producing a flashing visual signal upon activation of said remote alarm system by said remote microcontroller, said remote light being positioned adjacent to a light cover in said top of said remote housing;

said top of said remote housing being generally rectangular;

said remote housing having tapered sides extending downwardly from said outer perimeter edge to a rounded distal end relative to said top such that said remote housing forms a generally elongated inverted rectangular pyramid such that said remote housing is adapted to facilitate insertion of the remote housing into a pocket of a garment;

said remote housing having a clip extending downwardly from a lengthwise edge of said outer perimeter of said top such that said remote housing is adapted to facilitate coupling of the remote housing to a garment worn by a user;

said main alarm system including a main speaker, said main speaker being positioned adjacent to a speaker opening in a top of said main unit housing;

a battery compartment for receiving batteries for providing power to said main unit;

said main unit having an on/off switch for selectively activating said sensors of said main unit; and said remote unit having a remote unit on/off switch for selectively activating said remote unit.

* * * * *